United States Patent
Hart et al.

(10) Patent No.: US 10,232,947 B2
(45) Date of Patent: Mar. 19, 2019

(54) AIRCRAFT AIR SUPPLY SYSTEMS FOR REDUCING EFFECTIVE ALTITUDE OF FLIGHT DECKS

(71) Applicant: The Boeing Company, Chicago, IL (US)

(72) Inventors: Colin W. Hart, Everett, WA (US); Chao-Hsin Lin, Redmond, WA (US); Marcus K. Richardson, Bothell, WA (US)

(73) Assignee: The Boeing Company, Chicago, IL (US)

( * ) Notice: Subject to any disclaimer, the term of this patent is extended or adjusted under 35 U.S.C. 154(b) by 845 days.

(21) Appl. No.: 13/893,966

(22) Filed: May 14, 2013

(65) Prior Publication Data

US 2014/0342648 A1 Nov. 20, 2014

(51) Int. Cl.
*B64D 13/06* (2006.01)
*B64D 37/32* (2006.01)

(52) U.S. Cl.
CPC .............. *B64D 13/06* (2013.01); *B64D 37/32* (2013.01); *B64D 2013/0677* (2013.01); *B64D 2013/0681* (2013.01); *Y02T 50/56* (2013.01)

(58) Field of Classification Search
CPC ........... B64D 13/06; A62B 7/08; A62B 21/00; A62B 7/12; A62B 7/14; A62B 7/04
USPC ............ 454/76; 128/204.29, 205.24, 202.26; 55/68
See application file for complete search history.

(56) References Cited

U.S. PATENT DOCUMENTS

| | | | | |
|---|---|---|---|---|
| 2,900,890 | A * | 8/1959 | Fischer | B64D 13/02 137/81.1 |
| 2,929,377 | A * | 3/1960 | Cummins | A62B 9/022 128/204.25 |
| 3,177,679 | A * | 4/1965 | Quick | B64D 13/06 454/71 |
| 3,217,730 | A * | 11/1965 | Banning, Jr. | B63C 11/24 137/111 |
| 4,166,448 | A * | 9/1979 | Miller et al. | 126/299 D |
| 4,262,495 | A | 4/1981 | Gupta et al. | |
| 4,312,153 | A * | 1/1982 | Parkinson | E06B 7/231 244/129.5 |

(Continued)

FOREIGN PATENT DOCUMENTS

DE 102007018773 A1 10/2008
EP 2803582 A2 11/2014

OTHER PUBLICATIONS

European Search Report dated Apr. 28, 2015, European Patent Office.

(Continued)

*Primary Examiner* — Steven B McAllister
*Assistant Examiner* — Samantha Miller
(74) *Attorney, Agent, or Firm* — MH2 Technology Law Group LLP

(57) ABSTRACT

An aircraft air supply system may include a primary duct to supply a primary air flow to a flight deck of an aircraft. A nitrogen generating system may be configured for generating nitrogen enriched air and oxygen enriched air. A secondary duct may be provided for channeling the oxygen enriched air from the nitrogen generating system to the primary duct. The flow of the oxygen enriched air into the primary duct and to the flight deck may be controlled to reduce an effective altitude of the flight deck.

20 Claims, 2 Drawing Sheets

(56) References Cited

U.S. PATENT DOCUMENTS

| | | | |
|---|---|---|---|
| 4,428,372 A * | 1/1984 | Beysel | A62B 7/14 128/202.26 |
| 4,655,194 A * | 4/1987 | Wooden | 126/299 D |
| 4,681,602 A | 7/1987 | Glenn et al. | |
| 4,893,615 A | 1/1990 | Khabirova | |
| 5,025,642 A * | 6/1991 | Brunskill | B64D 13/06 62/402 |
| 5,169,415 A * | 12/1992 | Roettger | A62B 7/14 128/204.29 |
| 5,199,423 A * | 4/1993 | Harral | A62B 7/14 128/202.26 |
| 5,214,935 A * | 6/1993 | Brunskill | B64D 13/06 165/103 |
| 5,351,682 A * | 10/1994 | Foote | A62B 9/027 128/204.26 |
| 5,460,175 A * | 10/1995 | Foote | A62B 7/14 128/204.29 |
| 5,531,220 A * | 7/1996 | Cassidy | 128/204.29 |
| 5,565,017 A * | 10/1996 | Kang | C01B 13/0251 95/14 |
| 5,791,982 A | 8/1998 | Curry | |
| 5,944,284 A | 8/1999 | Bardel | |
| 6,142,142 A * | 11/2000 | Woodall et al. | 126/299 R |
| 6,701,923 B2 * | 3/2004 | Cazenave | A62B 7/14 128/204.22 |
| 6,955,710 B2 * | 10/2005 | Lessi | A62B 7/14 128/204.18 |
| 6,997,970 B2 | 2/2006 | Crome | |
| 7,051,731 B1 | 5/2006 | Rogerson | |
| 7,081,153 B2 * | 7/2006 | Leigh | B01D 53/0454 95/130 |
| 7,115,152 B2 * | 10/2006 | Friday | B01D 53/04 95/1 |
| 7,179,322 B2 | 2/2007 | Lyons | |
| 7,481,214 B2 | 1/2009 | Eilers | |
| 7,624,732 B2 * | 12/2009 | Mitchell | A62B 99/00 128/202.24 |
| 7,625,434 B2 | 12/2009 | Tom | |
| 7,784,462 B2 * | 8/2010 | Vogt | A62B 7/14 128/201.23 |
| 7,789,346 B2 * | 9/2010 | Horstman | B64D 13/06 244/118.5 |
| 8,015,973 B2 | 9/2011 | Geary | |
| 8,074,927 B2 | 12/2011 | Markwart | |
| 8,936,671 B2 * | 1/2015 | Horstman | B64D 13/06 244/118.5 |
| 9,089,721 B1 * | 7/2015 | Horstman | A62B 7/14 |
| 9,114,869 B1 * | 8/2015 | Barrett | B64C 1/1469 |
| 2004/0035411 A1 * | 2/2004 | Livchak et al. | 126/299 R |
| 2005/0173017 A1 * | 8/2005 | Moravec et al. | 141/66 |
| 2006/0171845 A1 * | 8/2006 | Martin | B64D 37/32 422/82.07 |
| 2007/0046078 A1 * | 3/2007 | Humfeldt et al. | A64D 83/02 297/142 |
| 2007/0062371 A1 | 3/2007 | Eilers | |
| 2007/0087677 A1 * | 4/2007 | Morris et al. | 454/61 |
| 2007/0160506 A1 * | 7/2007 | Ross et al. | A62B 7/08 422/122 |
| 2007/0221199 A1 * | 9/2007 | Hake et al. | 126/299 R |
| 2007/0245751 A1 | 10/2007 | Kulcke et al. | |
| 2008/0149770 A1 | 6/2008 | Hoffjann et al. | |
| 2009/0032011 A1 * | 2/2009 | Livchak et al. | 126/299 D |
| 2009/0044800 A1 * | 2/2009 | Jorn | B64D 13/06 128/203.12 |
| 2009/0093210 A1 * | 4/2009 | Livchak et al. | 454/363 |
| 2010/0024821 A1 | 2/2010 | Rittner et al. | |
| 2010/0043794 A1 | 2/2010 | Saito et al. | |
| 2011/0004151 A1 | 1/2011 | Simonsen et al. | |
| 2012/0055275 A1 * | 3/2012 | Lambertson | 73/866.5 |
| 2012/0055460 A1 * | 3/2012 | Lambertson | 126/299 D |
| 2012/0196521 A1 | 8/2012 | Geary | |
| 2012/0322358 A1 * | 12/2012 | Wendorski et al. | 454/340 |
| 2013/0312744 A1 * | 11/2013 | Kshirsagar et al. | A62B 18/02 128/202.26 |
| 2013/0341465 A1 * | 12/2013 | Massey | B64D 13/06 244/134 R |

OTHER PUBLICATIONS

Benningfield, Damond, "Safer Fuel Tanks", Air & Space magazine, Jul. 2004, pp. 1-4.

The Boeing Company, "Fuel", The Boeing 737 Technical Guide updated Feb. 24, 2013, downloaded from http://www.b737.org.uk/fuel.htm on Mar. 8, 2013, pp. 1-13.

Non-Final Office Action dated Mar. 23, 2017, for U.S. Appl. No. 14/620,422.

Final Office Action dated Sep. 20, 2017, for U.S. Appl. No. 14/620,422.

Non-Final Office Action dated Nov. 2, 2017, for U.S. Appl. No. 14/620,553.

Non-Final Office Action dated Jan. 8, 2018, for U.S. Appl. No. 14/620,422.

Final Office Action dated Apr. 18, 2018, for U.S. Appl. No. 14/620,553.

Extended European Search Report dated Jun. 29, 2016, from European Application No. 15 190 370.5 (8 pp.).

European Office Action dated Jul. 21, 2017, from European Application No. 15 190 370.5 (7 pp.).

* cited by examiner

AIRCRAFT AIR SUPPLY SYSTEMS FOR REDUCING EFFECTIVE ALTITUDE OF FLIGHT DECKS

FIELD

The present disclosure relates to aircraft and controlling the atmospheric conditions within aircraft, and more particularly to an aircraft air supply system for reducing the effective altitude of a flight deck by introducing oxygen enriched air from a nitrogen generating system.

BACKGROUND

Modern aircraft and particular commercial passenger aircraft have pressurized cabins that reduce the effective altitude within the aircraft while flying at higher altitudes. When an aircraft's cabin and flight deck effective altitude is reduced, the total pressure of the interior of the aircraft is increased. This leads to a higher differential pressure between the inside and outside of the aircraft with the stress becoming greater as the differential pressure increases. In order to reduce the altitude in this classical sense, either the structure of the aircraft would need to be redesigned or adjusted to safely withstand the higher pressure, or the aircraft is flown at a lower altitude. Although newer aircraft models whose fuselages are largely made of composite can withstand a higher differential pressure and in turn can handle a lower cabin and flight deck pressurized altitude, the effective altitude within the aircraft can be realized, without increasing the total pressure, by increasing the oxygen partial pressure to an equivalent lower altitude value.

Many commercial and other aircraft are equipped with nitrogen generating systems to generate nitrogen enriched air that is channeled into parts of the aircraft, such as fuel tanks, for creating an inert atmosphere. The nitrogen generating system also produces oxygen enriched air. However, the oxygen enriched air from the nitrogen generating system is dumped overboard and provides no further function to the aircraft. The nitrogen generating system receives bleed air flowing from at least one engine of the aircraft. During all phases of flight, a large portion (even majority) of the bleed air flow used in the nitrogen generating system is discarded in the form of oxygen enriched air. This bleed air flow is taken from the engine reducing its efficiency and thrust.

SUMMARY

In accordance with an embodiment, an aircraft air supply system may include a primary duct to supply a primary air flow to a flight deck of an aircraft. A nitrogen generating system may be configured for generating nitrogen enriched air and oxygen enriched air. A secondary duct may be provided for channeling the oxygen enriched air from the nitrogen generating system to the primary duct. The flow of the oxygen enriched air into the primary duct and to the flight deck may be controlled to reduce an effective altitude of the flight deck.

In accordance with another embodiment, an aircraft may include a flight deck where a flight crew controls operation of the aircraft and a passenger compartment. A nitrogen generating system may be configured for generating nitrogen enriched air and oxygen enriched air. An environmental control system may be configured to channel air to the flight deck and the passenger compartment of the aircraft. A primary duct in flow communication with the environmental control system and the flight deck may supply a flow of air to the flight deck. A secondary duct is in flow communication with the nitrogen generating system and the primary duct. The secondary duct may be configured to channel the flow of oxygen enriched air from the nitrogen generating system to the primary duct to reduce an effective altitude of the flight deck.

In accordance with further embodiment, a method for reducing an effective altitude of a flight deck of an aircraft may include supplying a primary air flow to the flight deck of the aircraft through a primary duct. The method may also include generating nitrogen enriched air and oxygen enriched air by a nitrogen generating system. The method may additionally include channeling the oxygen enriched air from the nitrogen generating system to the primary duct through a secondary duct. A flow of the oxygen enriched air into the primary duct and to the flight deck may be controlled to reduce an effective altitude of the flight deck.

In accordance with yet a further embodiment, oxygen enriched air is routed from a nitrogen generating system to a flight deck of an aircraft. The flight deck is on an air delivery system that is separate from the air delivery system for the passenger cabin and other parts of the aircraft. Because the flight deck and its associated delivery system have a smaller volume than the volume of the passenger cabin, the oxygen enriched air makes a noticeable difference in perceived altitude in the flight deck compared to the passenger cabin. In the exemplary embodiment, the flight deck delivery system may include a primary duct and a secondary duct in flow communication between the nitrogen generating system and the primary duct. The secondary duct may extend from the oxygen enriched air outlet of the nitrogen generating system to the primary duct upstream of any mixers and/or sensors associated with the primary duct. The oxygen enriched air flow mixes with the primary air flow within the primary duct and is supplied continuously to the primary duct. A check valve may be coupled to the secondary duct to prevent air from flowing towards the nitrogen generating system. Further, no additional oxygen generators may be needed because the oxygen enriched air is only being channeled to the flight deck, and not the larger passenger cabin.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

DESCRIPTION

Figure 1:
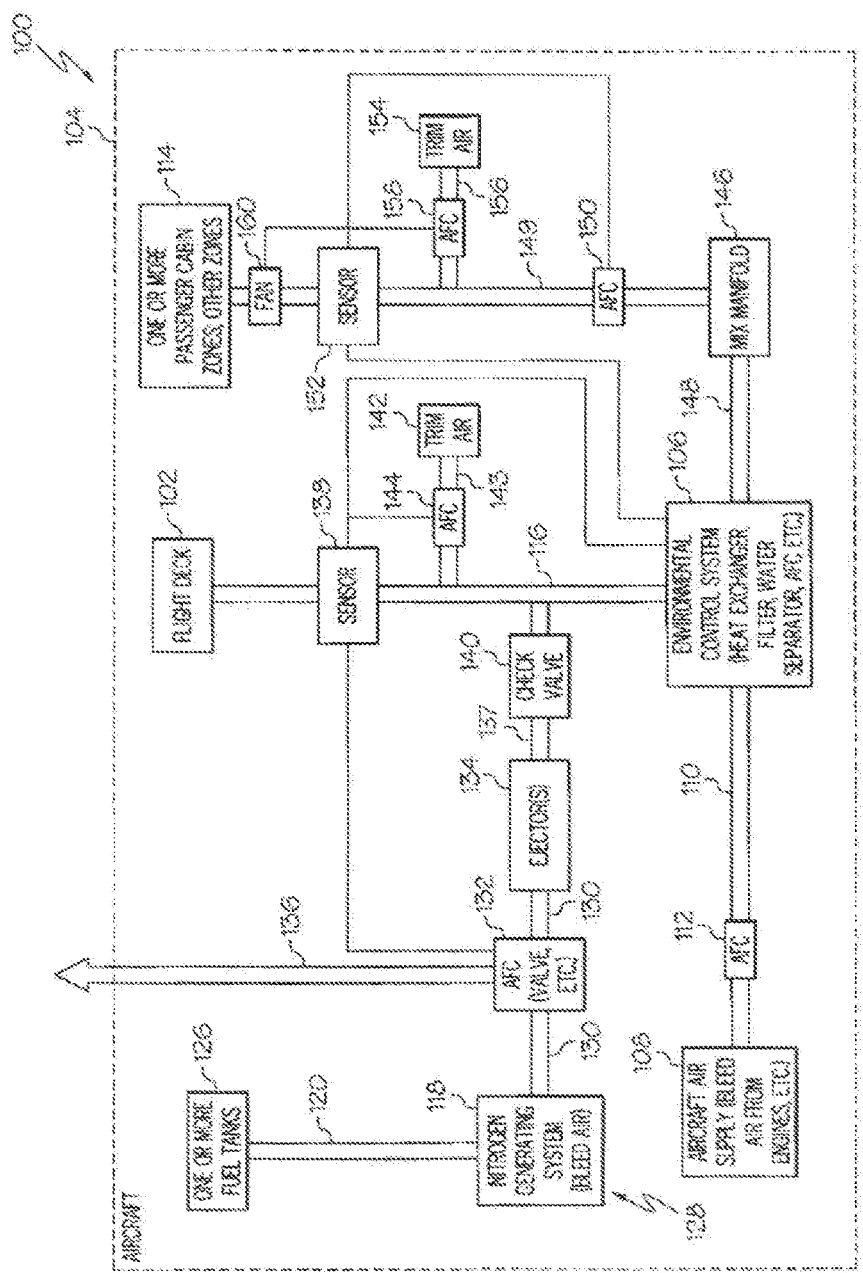
FIG. 1 is block schematic diagram of an example of an aircraft air supply system including features for reducing the effective altitude of a flight deck of an aircraft in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is block schematic diagram of an example of an aircraft air supply system 100 including features for reducing the effective altitude of a flight deck 102 of an aircraft 104 in accordance with an embodiment of the present disclosure. An aircraft environmental control system 106 may receive a flow of air from an aircraft air supply 108 through a duct 110 or channel in flow communication between the aircraft air supply 108 and the environmental control system 106. The aircraft air supply 108 may include or may be bleed air from one or more engines of the aircraft 104, air from another source, or a combination of bleed air from one or more engines and air from another source, such as an onboard oxygen generating system. An air flow control device 112 may control or regulate the flow of air through the duct 110 from the aircraft air supply 108 to the environmental control system 106. The air flow control device 112 may include a valve, baffle or other mechanism to control a volume or flow of air in the duct 110. The air flow control device 112 may control the air flow in the duct 110 in response to signals from one or more sensors (not shown in FIG. 1) that may be associated with the duct 110, environmental control system 106 or both.

The environmental control system 106 may be configured to channel air to the flight deck 102 and a passenger compartment 114 or one or more passenger cabin zones and other areas of the aircraft 104. The environmental control system 106 may condition the air for use in the flight deck 102, the passenger compartment 114 and other zones or areas of the aircraft 104. For example, the environmental control system 106 may include, but is not necessarily limited to, including a heat exchanger, air conditioning packs or similar devices to adjust the air to an appropriate temperature; a filter to remove any foreign substances that may be in the air; a water separator to remove any moisture or water vapor that may be in the air; and any other features or components to condition the air for use in the flight deck 102, the passenger compartment 114 and any other areas of the aircraft 104.

The aircraft air supply system 100 may include a primary duct 116 to supply a primary air flow to the flight deck 102 of the aircraft 104. The primary duct 116 may be in flow communication with the environmental control system 106 and the flight deck 102 for supplying the flow of air to the flight deck 102.

The aircraft 104 may also include a nitrogen generating system 118 that may be configured for generating nitrogen enriched air and oxygen enriched air. The nitrogen generating system 118 may receive bleed air from one or more engines of the aircraft 104, from other sources, or both. The nitrogen enriched air generated by the nitrogen generating system 118 may be directed through a duct 120 or channel to one or more fuel tanks 126 of the aircraft 104 to replace air in the fuel tanks as fuel is consumed during flight to create an inert atmosphere or environment within the fuel tanks 126. The nitrogen enriched air may also be channeled from the nitrogen generating system 118 to other areas of the aircraft 104 where an inert environment or atmosphere may be desired or needed. The nitrogen generating system 118, duct 120, and any other ducts or components may define an inert gas system 128 that channels the nitrogen enriched air to the fuel tanks 126 of the aircraft 104 and any other areas of the aircraft 104.

The aircraft air supply system 100 may also include a secondary duct 130 in flow communication with the nitrogen generating system 118 and the primary duct 116. The secondary duct 130 is configured to channel the flow of oxygen enriched air from the nitrogen generating system 118 to the primary duct 116 to reduce an effective altitude of the flight deck 102. The flow of oxygen enriched air into the primary duct 116 may be controlled to reduce the effective altitude of the flight deck 102 to a desired level. An air flow control device 132 in the secondary duct 130 may control a volume of oxygen enriched air that flows through the secondary duct 130 into the primary duct 116 and that flows into an overboard discharge duct 136. A sensor 138 may sense the volume, percentage of volume or partial pressure of oxygen enriched air in the primary duct 116 and the air flow control device 132 based on inputs from the sensor 138 may control a percentage of volume of oxygen enriched air flowing in each of the secondary duct 130 and the overboard discharge duct 136. The air flow control device 132 may be a valve, controllable baffle or other mechanism to selectively divide the air flow between the secondary duct 130 and the discharge duct 136.

An ejector or series of ejectors 134 may be coupled to the secondary duct 130 or secondary duct portion 137 of the secondary duct 130. The ejector or series of ejectors 134 may be disposed within the secondary duct 130 at an entrance to the secondary duct portion 137. The ejector or series of ejectors 134 may boost the pressure of the oxygen enriched air before entering the primary duct 116 to the flight deck 102. The ejector or series of ejectors 134 may also be part of or may be considered part of the air flow control device 132.

The aircraft air supply system 100 may additionally include a check valve 140 coupled to the secondary duct portion 137 downstream of the air flow control device 132 and ejector 134. The check valve 140 may prevent air from flowing back towards the nitrogen generating system 118.

The secondary duct 130 or secondary duct portion 137 is connected into the primary duct 116 at a location to inject the oxygen enriched into the primary duct 116 sufficiently upstream of the flight deck 102 air supply exits such that the main air supply and oxygen enriched air flows have sufficient distance to mix naturally without a mechanism for mixing the flows.

Trim air 142 may also be directed into the primary duct 116 by a trim air duct 143. Trim air 142 is essentially hot pure bleed air that has not gone through the air conditioning packs of the environmental control system 106. The trim air 142 serves to control the temperature of the air being distributed to the flight deck 102 and the main cabin or passenger compartment 114. The trim air 142 mixes with the cold air coming off the air conditioning packs of the environmental control system 106 to provide the desired temperature. The trim air 142 flowing into the primary duct 116 may be controlled by another air flow control device 144. The air flow control device 144 may be controlled by the sensor 138 or by another sensor associated with the primary duct 116 supplying airflow to the flight deck 102. The air flow control device 144 may be similar to the air flow control device 132.

The aircraft air supply system 100 may additionally include a mix manifold 146 to receive air flowing through at least one main duct 148 from the environmental control system 106. The mix manifold 146 may distribute the air flow to the passenger compartment 114 which may include multiple cabin zones or areas, and other areas of the aircraft. The distribution of air flow from the mix manifold 146 may be through multiple environmental air supply ducts. However, for purposes of explanation and clarity, only a single exemplary environmental air supply duct 149 is shown in FIG. 1. Other air supply ducts may have a similar configuration. The air supply duct 149 may include an air flow control device 150 similar to the air flow control devices previously described. The volume or flow of air through the air flow control device 150 may be controlled by a sensor 152. The sensor 152 may also be electrically connected to the environmental control system 106 for overall operation and control of the aircraft air supply system 100.

Trim air 154 may also be directed into the air supply duct 149 through another duct 156. The flow of the trim air 154 into the air supply duct 149 may be controlled by another air flow control device 158. The air flow control device 158 may be controlled by the sensor 152 or by another similar sensor. A fan 160 may be provided to drive the re-circulated air in the passenger compartment 114 or main cabin. The fan 160 may be controlled by a sensor, such as sensor 152, for example, or by manual controls provided for operation by a crew member.

Figure 2:
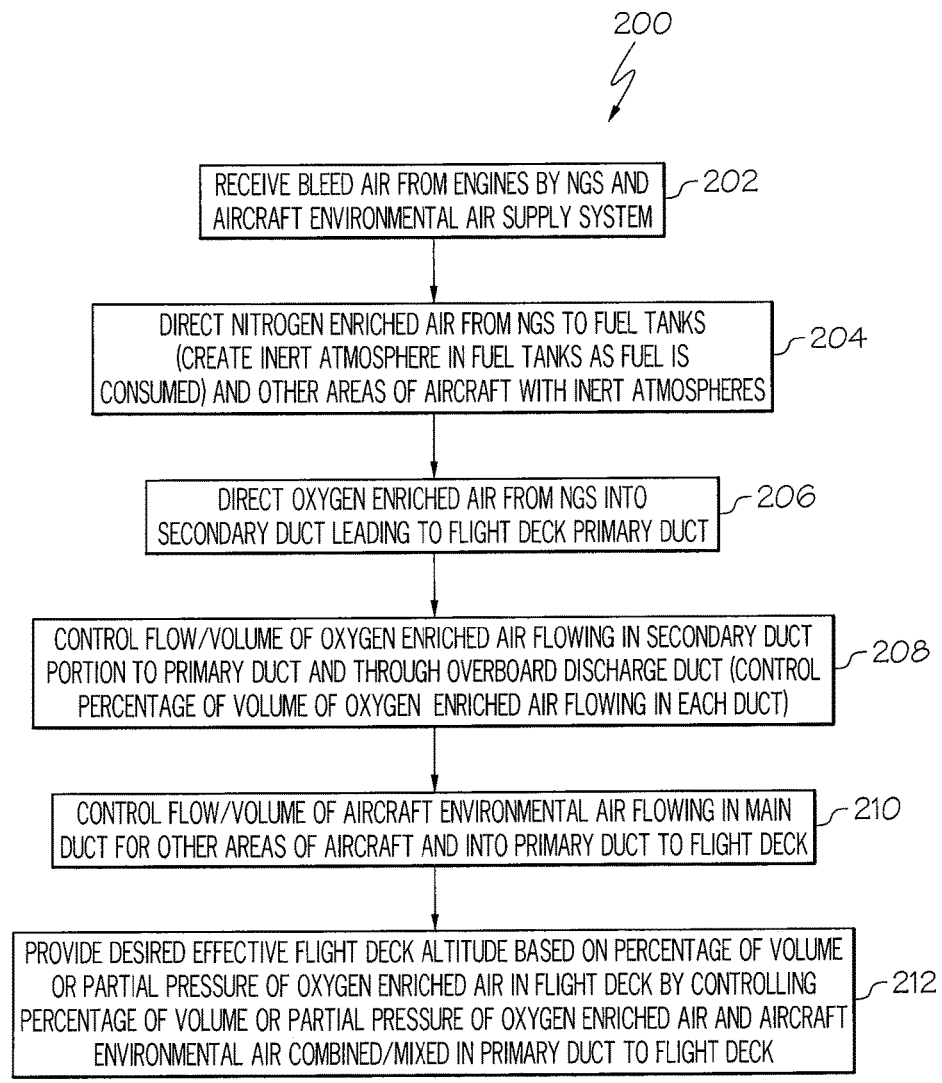
FIG. 2 is a flow chart of an example of a method for reducing the effective altitude of a flight deck of an aircraft in accordance with an embodiment of the present disclosure.

FIG. 2 is a flow chart of an example of a method 200 for reducing the effective altitude of a flight deck of an aircraft in accordance with an embodiment of the present disclosure. The method 200 may be performed by the aircraft air supply system 100 in FIG. 1 or a similar air supply system. In block 202, bleed air may be received by a nitrogen generating system and by an aircraft environmental air supply system from one or more engines of an aircraft. Alternatively, air may be received by the nitrogen generating system from one or more other sources or from both bleed air from the engines and other sources.

In block 204, nitrogen enriched air from the nitrogen generating system may be supplied or directed to a fuel tank oxygen replacement system or directly to the fuel tank or tanks. The nitrogen enriched air is used to create an inert atmosphere in the fuel tank or tanks as fuel is consumed by the aircraft. The nitrogen enriched air may also be supplied to other areas of the aircraft where inert atmospheres may be desirable or needed.

In block 206, oxygen enriched air from the nitrogen generating system may be supplied or channeled into a secondary duct in flow communication with a primary duct that supplies primary air to the flight deck of the aircraft.

In block 208, the flow or volume of oxygen enriched air flowing in the secondary duct to the primary duct may be controlled to reduce an effective altitude of the flight deck. The remainder of the aircraft may be maintained at a higher effective altitude than the flight deck. Any oxygen enriched air not flowing through the secondary duct portion to the primary duct may be discharged overboard through an overboard discharge duct. Similar that previously described the percentage of oxygen enriched air flowing in the secondary duct and the overboard discharge duct may be controlled by a sensor in the primary duct controlling the operation of an airflow control device, such as a valve, baffle or other device for dividing the airflow of the oxygen enriched air into the different ducts.

In block 210, the flow or volume of aircraft environmental air flowing in a main duct to other areas of the aircraft and into the primary duct to the flight deck may be controlled. The flow of the air in each of the ducts may be controlled by an airflow control device and associated sensor similar to that previously described.

In block 212, a desired effective flight deck altitude may be provided based on the volume of oxygen enriched air in the flight deck. The percentage of volume, partial pressures, and/or flow of oxygen enriched air and the aircraft environmental air combined or mixed in the primary duct and channeled to the flight deck may be controlled to provide the desired effective flight deck altitude. The percentage of volume or partial pressures of the oxygen enriched air and the aircraft environmental air may be controlled by airflow control devices and associated sensors similar to that previously described or by other mechanisms.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. An aircraft air supply system, comprising:
   an environmental control system;
   a primary duct configured to channel air from the environmental control system to supply a primary air flow to a flight deck of an aircraft;
   a nitrogen generating system configured to generate nitrogen enriched air and oxygen enriched air; and
   a secondary duct configured to channel the oxygen enriched air from the nitrogen generating system to the primary duct, downstream from the environmental control system, where the primary duct directs the oxygen enriched air to the flight deck;
   wherein flow of the oxygen enriched air into the primary duct and to the flight deck is controlled to maintain the flight deck at a lower effective altitude than a passenger compartment of the aircraft when the aircraft is flying above a predetermined actual altitude.

2. The aircraft air supply system of claim 1, further comprising:
   an air flow control device configured to control a volume of the oxygen enriched air directed to the flight deck.

3. The aircraft air supply system of claim 1, wherein the environmental control system is configured to control air flow into the primary duct, to the flight deck, and to other areas of the aircraft.

4. The aircraft air supply system of claim 1, further comprising:
   a sensor configured to sense a percentage of volume or partial pressure of the oxygen enriched air in the primary duct proximate to the flight deck.

5. The aircraft air supply system of claim 4, further comprising:
   an air flow control device in the secondary duct configured to control the percentage of volume or the partial pressure of a first portion of the oxygen enriched air that flows through a secondary duct portion into the primary duct and a second portion of the oxygen enriched air that flows into an overboard discharge duct;
   wherein the air flow control device is further configured to control the percentage of volume or the partial pressure of the oxygen enriched air flowing through the secondary duct portion and flowing into the overboard discharge duct based on input from the sensor.

6. The aircraft air supply system of claim 5, further comprising:
a check valve in the secondary duct portion downstream of the air flow control device.

7. The aircraft air supply system of claim 4, wherein the secondary duct is coupled to the primary duct upstream of the sensor.

8. The aircraft air supply system of claim 1, wherein the primary duct is separate from any duct supplying air to other areas of the aircraft.

9. An aircraft, comprising:
a flight deck where a flight crew controls operation of the aircraft;
a passenger compartment;
a nitrogen generating system configured to generate nitrogen enriched air and oxygen enriched air;
an environmental control system configured to channel air to the flight deck and to the passenger compartment;
a primary duct, in flow communication with the environmental control system and the flight deck, configured to supply a flow of the air to the flight deck; and
a secondary duct in flow communication with the nitrogen generating system and the primary duct;
wherein the secondary duct is configured to channel a flow of the oxygen enriched air from the nitrogen generating system to the primary duct, downstream from the environmental control system, where the primary duct directs the oxygen enriched air to the flight deck to maintain the flight deck at a lower effective altitude than the passenger compartment when the aircraft is flying above a predetermined actual altitude.

10. The aircraft of claim 9, further comprising:
an air delivery system in flow communication between the environmental control system and the passenger compartment;
wherein the primary duct is separate from the air delivery system.

11. The aircraft of claim 9, further comprising:
an inert gas system configured to channel the nitrogen enriched air to one or more fuel tanks of the aircraft.

12. The aircraft of claim 9, further comprising:
an air flow control device configured to control a percentage of volume or partial pressure of the oxygen enriched air directed to the flight deck.

13. The aircraft of claim 9, further comprising:
a sensor configured to sense a percentage of volume or partial pressure of the oxygen enriched air in the primary duct proximate to the flight deck.

14. The aircraft of claim 13, further comprising:
an air flow control device in the secondary duct configured to control the percentage of volume or the partial pressure of a first portion of the oxygen enriched air that flows through a secondary duct portion into the primary duct and a second portion of the oxygen enriched air that flows into an overboard discharge duct;
wherein the air flow control device is further configured to control the percentage of volume or the partial pressure of the oxygen enriched air flowing through the secondary duct portion and flowing into the overboard discharge duct based on input from the sensor.

15. The aircraft of claim 14, further comprising:
a check valve in the secondary duct portion downstream of the air flow control device.

16. A method for reducing an effective altitude of a flight deck of an aircraft, the method comprising:
supplying a primary air flow from an environmental control system to the flight deck through a primary duct;
generating nitrogen enriched air and oxygen enriched air using a nitrogen generating system; and
channeling the oxygen enriched air from the nitrogen generating system to the primary duct through a secondary duct;
wherein flow of the oxygen enriched air into the primary duct, downstream from the environmental control system, and to the flight deck is controlled to maintain the flight deck at a lower effective altitude than the passenger compartment when the aircraft is flying above a predetermined actual altitude.

17. The method of claim 16, further comprising:
controlling flow of a first portion of the oxygen enriched air flowing in a secondary duct portion to the primary duct and a second portion of the oxygen enriched air flowing in an overboard discharge duct.

18. The method of claim 16, further comprising:
providing a desired effective flight deck altitude based on a percentage of volume or partial pressure of the oxygen enriched air in the flight deck by controlling the flow of the oxygen enriched air into the primary duct.

19. The method of claim 16, further comprising:
controlling air flow into the primary duct, to the flight deck, and to other areas of the aircraft.

20. The method of claim 16, further comprising:
sensing a percentage of volume or partial pressure of the oxygen enriched air in the primary duct proximate to the flight deck.

* * * * *